United States Patent Office 3,280,114
Patented Oct. 18, 1966

3,280,114
17-LOWER ALKYL ETHERS OF 6-CHLORO-$\Delta^{4,6}$-PREGNADIEN-17α-OL-3,20-DIONE
Fred A. Kincl, Mexico City, Mexico, assignor, by mesne assignments, to Syntex Corporation, a corporation of Panama
No Drawing. Filed Mar. 24, 1961, Ser. No. 97,995
4 Claims. (Cl. 260—239.55)

The present invention relates to novel cyclopentanophenanthrene compounds.

More particularly the present invention relates to novel 17-lower alkyl ethers of 6-chloro-$\Delta^{4,6}$-pregnadien-17α-ol-3,20-dione of the following formula:

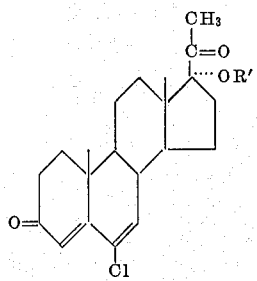

In the above formula R' represents lower alkyl such as methyl or ethyl.

The novel compounds of the present invention as above set forth are therapeutic agents, having progrestational, anti-estrogenic, anti-androgenic and anti-ovulatory activity, when given orally or by injection.

The compounds of the present invention may be prepared as illustrated by the following reaction scheme:

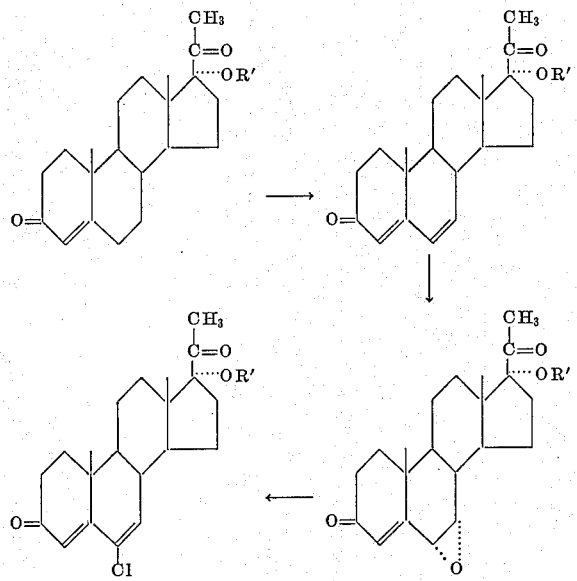

In the above formulae, R' represents the same group as before.

In practicing the process for preparing the novel compounds of the present invention, 17α-alkyloxy progesterone is treated with oxidizing agents capable of introducing an additional double bond between carbons 5 and 6, as for example chloranil, and the resulting $\Delta^{4,6}$-3-keto-diene is converted into the 6,7-epoxide by treatment with an organic peracid such as perbenzoic acid.

Treatment of the 6,7-oxido compound with hydrogen chloride followed by further treatment with a strong mineral acid gives the 6-chloro-$\Delta^{4,6}$-17α-alkoxy pregnadiene derivatives.

The starting materials for the preparation of the compounds of the present invention may be prepared for example from 17α-hydroxy progesterone by treatment with an alkyl iodide in presence of silver oxide and in solvents, neutral to the reaction, as for example aromatic hydrocarbons, such as benzene or toluene, ethers, such as diethyl ether or dioxane or ether neutral solvents such as acetonitrile or dimethyl formamide.

Alternatively, the etherification of the 17α-hydroxyl may be carried out using alkyl idiodes in presence of sodamide in liquid ammonia.

Specifically, to form the starting material, 17α-hydroxyprogesterone is reduced, as for example with sodium borohydride in aqueous methanol or lithium aluminum hydride in tetrahydrofuran, to give $\Delta^4$-pregnene-3β,17α,20-triol. Treatment of this compound with acetic anhydride in pyridine gives the 3,20-diacetate, which is then treated with an alkyl iodide and sodamide, preferably in presence of inert solvents such as tetrahydrofuran, in liquid ammonia. The reaction is generally completed within 2 to 16 hours, and may be carried out at room temperature. The resulting 17α-alkoxy derivative is then treated with an alkaline agent, such as sodium bicarbonate, to saponify any residual acetyl groups and oxidized in conventional manner, as for example with chromic acid in acetone, to produce the 17-alkoxy progesterone.

The alkyl iodides above referred to are preferably selected from alkyl iodides of less than 5 carbon atoms; typical examples of such alkyl iodides are methyl iodide, ethyl iodide, n-propyl iodide or unsaturated alkyl iodides such as propargyl iodide or methallyl iodide.

Alternatively, the novel compounds of the present invention may be prepared by introducing the 6-chloro-$\Delta^6$-dehydro moiety into 17α-hydroxyprogesterone by the same sequence of reactions as described above and then introducing the desired 17-alkyl group, preferably by treatment with an alkyl iodide in presence of silver oxide.

The following specific examples serve to illustrate but are not intended to limit the present invention:

*Example I*

1 g. of 17α-hydroxy progesterone, dissolved in 20 cc. of formamide was stirred at room temperature in presence of 55 ml. of methyl iodide and 2.8 g. of silver oxide for 15 hrs. About 200 cc. of methylene dichloride was added, the resulting precipitate was removed by filtration, was washed with methylene dichloride and the combined filtrates were evaporated to dryness. The resulting crude product was dissolved in benzene and purified by chromatography on alumina. Fractions, eluted with ether: benzene were combined, the solvent was evaporated and the crystalline material thus obtained was recrystallized from ether-hexane to give 17α-methoxy progesterone, λ max 240 mμ (log ε 4.15). Using the same method as above substituting ethyl iodide for the methyl iodide there was prepared 17α-ethoxy progesterone.

*Example II*

1 g. of 17α-methoxy progesterone (17α-methoxy-$\Delta^4$-pregnene-3,20-dione) was refluxed for 8 hours with 2 g. of chloranil and 50 cc. of terbutanol. The mixture was cooled, the excess chloranil filtered and washed with ethyl acetate. The reunion of the organic extracts was washed with a cold 10% sodium hydroxide aqueous solution until the washings were colorless. It was then dried over anhydrous sodium sulfate and evaporated to dryness. Recrystallization from methylene chloride ether gave 17α-methoxy-$\Delta^{4,6}$-pregnadiene-3,20-dione.

*Example III*

1 g. of the foregoing compound was dissolved on 25 cc. of methylene chloride and treated with an ether solution containing 5 mol. equivalents of monoperphthalic acid. The resulting mixture was left at room temperature for 24 hours, washed successively with a 5% sodium bicarbonate aqueous solution, water, then dried over anhydrous sodium sulfate and concentrated to incipient crystallization. The mixture was cooled and the crystals thus formed were collected, affording 17α-methoxy-6α,7α-oxido-Δ4-pregnene-3,20-dione.

*Example IV*

Into a suspension of 0.75 g. of the foregoing steriod in 25 cc. of glacial acetic acid, was passed a slow stream of dry hydrochloric acid for 5 hours. After 5 minutes all the solid had dissolved.

The solution was poured into ice water, the precipitate formed was collected, washed to neutrality and dried. Recrystallization from methylene chloride-acetone afforded 6-chloro-17α-methoxy-Δ$^{4,6}$-pregnadiene-3,20-dione.

*Example V*

1 g. of 17α-ethoxy progesterone was treated following exactly the technique described in Example II, thus furnishing 17α-ethoxy-Δ$^{4,6}$-pregnadiene-3,20-dione.

*Example VI*

A solution of 1 g. of 17α-ethoxy-Δ$^{4,6}$-pregnadiene-3,20-dione in 25 cc. of methylene chloride was oxidized using exactly the same conditions described in Example III yielding 17α-ethoxy-6α,7α-oxido-Δ4-pregnene-3,20-dione.

*Example VII*

0.75 g. of 17α-ethoxy-6α,7α-oxido-Δ4-pregnene-3,20-dione was suspended in 25 cc. of glacial acetic acid and treated in the same manner as described in Example IV thus affording 6-chloro-17α-ethoxy-Δ$^{4,6}$-pregnadiene-3,20-dione.

I claim:
1. A compound of the following formula:

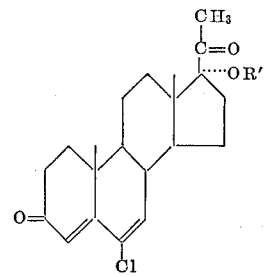

wherein R' represent a lower alkyl group.
2. 6-chloro-17α-methoxy-Δ$^{4,6}$-pregnadiene-3,20-dione.
3. 6-chloro-17α-ethoxy-Δ$^{4,6}$-pregnadiene-3,20-dione.
4. A compound of the following formula:

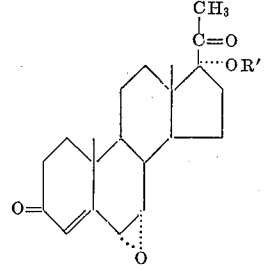

wherein R' represents a lower alkyl group.

No references cited.

LEWIS GOTTS, *Primary Examiner.*

L. H. GASTON, M. LIEBERMAN, M. A. GANNON, G. E. LANDE, *Assistant Examiners.*